(12) United States Patent
Yamashita

(10) Patent No.: US 7,437,399 B2
(45) Date of Patent: Oct. 14, 2008

(54) METHOD AND APPARATUS FOR AVERAGING PARITY PROTECTED BINARY NUMBERS

(75) Inventor: Hideo Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 663 days.

(21) Appl. No.: 10/855,528

(22) Filed: May 28, 2004

(65) Prior Publication Data

US 2005/0138099 A1    Jun. 23, 2005

(30) Foreign Application Priority Data

Dec. 17, 2003  (JP) ............... 2003-419781

(51) Int. Cl.
*G06F 7/38* (2006.01)
(52) U.S. Cl. .................................... 708/445
(58) Field of Classification Search ................. 708/445
See application file for complete search history.

(56) References Cited

U.S. PATENT DOCUMENTS 4,894,794 A * 1/1990 Shenk ..................... 708/290
5,883,824 A * 3/1999 Lee et al. .................. 708/445

FOREIGN PATENT DOCUMENTS

| JP | 51-147934 | 12/1976 |
| JP | 52-135256 | 11/1977 |
| JP | 7-73163 | 3/1995 |
| JP | 10-105382 A | 4/1998 |

* cited by examiner

*Primary Examiner*—Tan V Mai
(74) *Attorney, Agent, or Firm*—Staas & Halsey LLP

(57) ABSTRACT

A method and an apparatus for averaging includes generating a carry using a least significant bit of each of two binary numbers, wherein the two binary numbers include a first binary number and a second binary number, and adding a first shifted binary number, a second shifted binary number, and the carry generated, thereby outputting an average of the two binary numbers. The carry generated is added to the least significant bit position. The first shifted binary number is obtained by right-shifting the first binary number by one bit, and the second shifted binary number by right-shifting the second binary number by one bit.

13 Claims, 10 Drawing Sheets

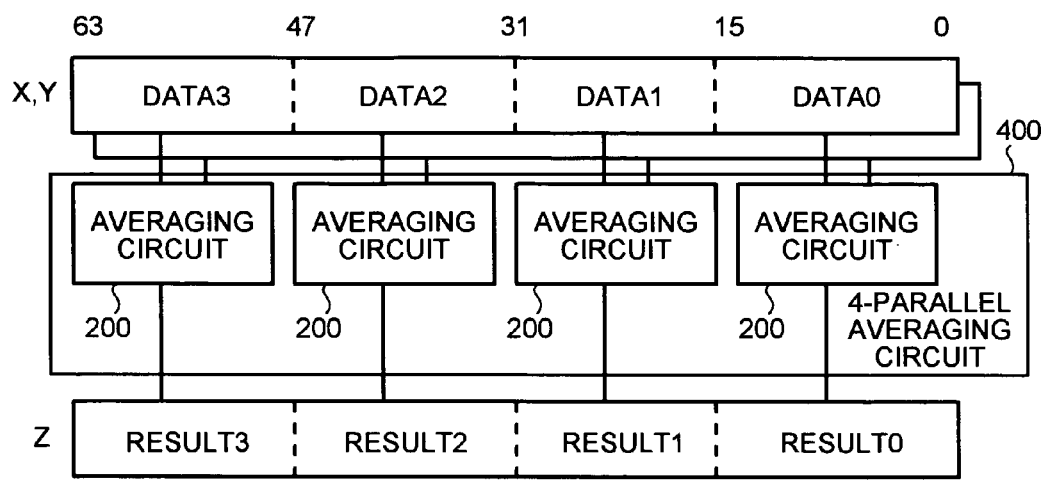

METHOD AND APPARATUS FOR AVERAGING PARITY PROTECTED BINARY NUMBERS

BACKGROUND OF THE INVENTION

1) Field of the Invention

The present invention relates to a method and an apparatus for calculating an average of two parity protected binary numbers.

2) Description of the Related Art

Calculating an average (hereinafter, "averaging") two sets of data is a basic process in image processing for MPEG (Motion Picture Expert Group) and DVD (digital versatile disk). With the widespread use of digital imaging, quick data averaging is desired.

FIG. 9A illustrates a basic averaging process. Two 16-bit binary numbers X<15:00> and Y<15:00> are rounded off to obtain an average Z<15:00>, where <15:00> denotes 16 bits from "bit 0" to "bit 15"; "bit 0" being the least significant bit, and "bit 15" being the most significant bit. The basic averaging process is explained below.

(1) Add X<15:00> and Y<15:00> to obtain Z'<16:00>.

(2) Divide Z' by 2. It is known that shifting a binary number to the right by one bit divides the binary number by 2. Therefore, shift Z' to the right by one bit to obtain Z"<15:−1>.

(3) If rounding off method is used, "1" is added to Z"<−1>, and the higher 16 bits Z"<15:00> are used as the average Z<15:00>. The bit in position <−1> is discarded. Whereas, if rounding down method is used, the higher 16 bits Z"<15:00> are used as the average Z<15:00>.

For example, from X=49834 (decimal)=1100 0010 1010 1010 (binary) and Y=34085 (decimal)=1000 0101 0010 0101 (binary), a rounded-off average of the two numbers, Z=41960 (decimal)=1010 0011 1110 1000 (binary), can be derived by the following procedure.

(1) Add the two numbers.

Z' (decimal)=49834+34085=83919

Z' (binary)=1100 0010 1010 1010+1000 0101 0010 0101=1 0100 0111 1.100 1111

(2) Shift the sum to the right by one bit. In this case, "." indicates the position of the decimal point.

Z" (decimal)=83919÷2=41959.5

Z" (binary)=1010 0011 1110 0111.1

(3) Add "1" to the first digit after the decimal point for rounding off.

Z (decimal)=41959.5+0.5=41960

Z (binary)=1010 0011 1110 0111.1+0.1=1010 0011 1110 1000

FIG. 9B illustrates an averaging circuit for calculating an average by the basic averaging process. An adder 921 inputs two 16-bit data X<15:00> and Y<15:00> and outputs a 17-bit result Z'<16:00>. Then, a shifter 922 shifts Z' to the right by one and outputs Z"<15:−1>. Finally, a rounding circuit 923 adds "1" to the least significant bit in Z" for rounding off. Thus, the 16-bit average Z<15:00> is obtained.

Thus, averaging by the basic averaging process requires three arithmetic circuits, the adder 921, the shifter 922 and the rounding circuit 923. This increases processing time and number of arithmetic circuits. Therefore, the averaging process is being improved to reduce processing time and the number of arithmetic circuits.

FIG. 9C illustrates an improved averaging process. In Japanese Patent Application Laid-open No. H 10-105382, two 16-bit binary numbers X<15:00> and Y<15:00> are rounded off to obtain an average Z<15:00>, as explained in the following rounding procedure.

(1) Add X<15:00>, Y<15:00> and "1" for rounding off to obtain Z'<16:00>.

(2) Divide Z' by 2 to obtain an average. It is known that shifting a binary number to the right by one bit divides the binary number by 2. Therefore, shift Z' to the right by one bit to obtain Z<15:0>. The value of Z<−1> shifted out through the shift process is not included in the result.

Specifically, like in the previous example, from X=49834 (decimal)=1100 0010 1010 1010 (binary) and Y=34085 (decimal)=1000 0101 0010 0101 (binary), a rounded-off average of the two numbers, Z=41960 (decimal)=1010 0011 1110 1000 (binary), can be derived according to the improved process by the following procedure.

(1) Add two numbers and "1" for rounding. The addition of "1" can be achieved easily by putting "1" on the carry to the least significant bit.

Z' (decimal)=49834+34085+1=83920

Z' (binary)=1100 0010 1010 1010+1000 0101 0010 0101+1=1 0100 0111 1101 0000

(2) Shift the sum to the right by one bit. In this case, "." indicates the position of the decimal point.

Z' (decimal)=83919÷2=41960

Z (binary)=1010 0011 1110 1000.0

FIG. 9D illustrates an averaging circuit for calculating an average by the improved averaging process. An adder 941 inputs two 16-bit data X<15:00> and Y<15:00> and "1" as the carry to the least significant bit to obtain a 17-bit result Z'<16:00>.

Then, a shifter 942 shifts Z'<16:00> to the right by one bit to obtain the result Z<15:00>. Such an improved process uses two arithmetic circuits, the adder 941 and the shifter 942, to calculate an average. Thus, processing time and number of arithmetic circuits reduce.

On the other hand, in data that can be processed by a computer, parity is added to improve reliability. An averaging circuit for calculating an average of data protected by parity is explained next.

To obtain a parity protected average of two parity protected data, the adder and the shifter in the averaging circuit require an additional circuit for predicting output parity based on input data and input parity. Parity prediction logic in the adder and the shifter is explained below.

The parity prediction logic in the adder is explained first. In this case, two 8-bit input data are represented by X<7:0> and Y<7:0> and their respective parities are given by XP and YP. In the adding operation, if H denotes half-added data at each bit and C denotes a carry to each bit, parity ZP for the sum Z is represented by the following equation. In this equation, "∀" indicates Exclusive-OR (xor), "+" indicates logical sum (or), "&" indicates logical product (and), and "^" indicates Inversion (not). The parity in this example is odd parity.

$$ZP = \char`\^(Z<7> \forall Z<6> \forall Z<5> \forall Z<4> \forall Z<3>$$
$$\forall Z<2> \forall Z<1> \forall Z<0>)$$
$$= \char`\^[(H<7> \forall C<7>) \forall (H<6> \forall C<6>) \forall (H<5>$$
$$\forall C<5>) \forall (H<4> \forall C<4>) \forall (H<3> \forall C<3>)$$
$$\forall (H<2> \forall C<2>) \forall (H<1> \forall C<1>) \forall (H<0> \forall C<0>)]$$
$$= \char`\^[(H<7> \forall H<6> \forall H<5> \forall H<4> \forall H<3>$$
$$\forall H<2> \forall H<1> \forall H<0>) \forall (C<7> \forall C<6> \forall C<5> \forall C<4> \forall C<3> \forall C<2> \forall C<1> \forall C<0>)]$$
$$= \char`\^[[(X<7> \forall Y<7>) \forall (X<6> \forall Y<6>) \forall (X<5> \forall Y<5>) \forall (X<4> \forall Y<4>) \forall (X<3> \forall Y<3>) \forall (X<2> \forall Y<2>) \forall (X<1> \forall Y<1>) \forall (X<0> \forall Y<0>)] \forall (C<7> \forall C<6> \forall C<5> \forall C<4> \forall C<3> \forall C<2> \forall C<1> \forall C<0>)]$$
$$= \char`\^[[(X<7> \forall X<6> \forall X<5> \forall X<4> \forall X<3> \forall X<2> \forall X<1> \forall X<0>] \forall [(Y<7> \forall Y<6> \forall Y<5> \forall Y<4> \forall Y<3> \forall Y<2> \forall Y<1> \forall Y<0>)]$$
$$\forall (C<7> \forall C<6> \forall C<5> \forall C<4> \forall C<3> \forall C<2> \forall C<1> \forall C<0>)]$$
$$= \char`\^[\char`\^XP \forall \char`\^YP \forall (C<7> \forall C<6> \forall C<5> \forall <4> \forall C<3> \forall C<2> \forall C<1> \forall C<0>)]$$

Thus, the parity for the sum can be derived from the Excusive-OR of respective input parities and the Excusive-OR of carries to respective bits generated during the addition of the input data.

If P denotes a carry propagation condition and G denotes a carry generation condition for each input bit, the carry C is represented by:

$$C<7> = G<6> + P<6> \& G<5> + P<6> \& P<5> \& G<4> + P<6> \& P<5> \& P<4> \& G<3> + P<6> \& P<5> \& P<4> \& P<3> \& G<2> + P<6> \& P<5> \& P<4> \& P<3> \& P<2> \& G<1> + P<6> \& P<5> \& P<4> \& P<3> \& P<2> \& P<1> \& G<0> + P<6> \& P<5> \& P<4> \& P<3> \& P<2> \& P<1> \& P<0> \& CIN$$

$$C<6> = G<5> + P<5> \& G<4> + P<5> \& P<4> \& G<3> + P<5> \& P<4> \& P<3> \& G<2> + P<5> \& P<4> \& P<3> \& P<2> \& G<1> + P<5> \& P<4> \& P<3> \& P<2> \& P<1> \& G<0> + P<5> \& P<4> \& P<3> \& P<2> \& P<1> \& P<0> \& CIN$$

⋮

$$C<2> = G<1> + P<1> \& G<0> + P<1> \& P<0> \& CIN$$
$$C<1> = G<0> + P<0> \& CIN$$
$$C<0> = CIN$$

CIN is equal to "1" if the averaging process is based on rounding off and "0" if it is based on rounding down.

P and G are represented by:

$$P_{<n>} = X_{<n>} + Y_{<n>}$$

$$G_{<n>} = X_{<n>} \& Y_{<n>}$$

Thus, if logic corresponding to the Excusive-OR of the carries to respective bits is denoted by □, the following equation is given:

$$ZP = \char`\^[\char`\^XP \forall \char`\^YP] \forall [X<7:0> \square Y<7:0>]$$

The logic □ is called Summed parity inversion prediction logic, and is complex as shown above. In this logic, the carry used to obtain the parity has the sole purpose of checking correctness of the adder and does not use the carry from the adder as it is. Rather, it requires a different circuit to obtain a carry from the inputs X<7:0> and Y<7:0>.

FIG. 9E illustrates an example of a conventional parity protected adder. XP<1:0> and YP<1:0> are 2-bit parities added to 16-bit input data X<15:00> and Y<15:00> on an 8-bit basis. A summed parity inversion prediction circuit 952 achieves the logic □ in the equation for obtaining ZP.

A parity protected adder 950 has a delay critical path, which begins from the input X, Y, then passes through the summed parity inversion prediction circuit 952 for the logic □, and finally enters Excusive-OR together with the result from Excusive-OR of input parities to output the parity ZP<1:0>.

Parity prediction logic in shift operation is explained next. If input data X<7:0> and its corresponding parity XP are given, the parity ZP for a shifted result Z can be derived from xor of input parity XP, shift-out data from parity unit of the input parity, and shift-in data.

Accordingly, the parity ZP of the result of shifting the input data X<7:0> to the right by one bit, can be obtained as follows.

$$ZP = XP \forall (``0" \forall X<0>)$$

FIG. 9F illustrates an example of a conventional parity protected shifter. A parity protected shifter 960 includes a 1-bit-right shifter for 16-bit data and a shifted parity inversion prediction circuit 962. When 16-bit data X<15:00> is given parity XP<1:0>, the resultant parity ZP<1:0> can be derived from:

$$ZP<1> = XP<1> \forall X<8>$$

$$ZP<0> = XP<0> \forall X<8> \forall X<0>$$

Thus, the conventional parity protected shifter 960 has a delay critical path, which subjects the input X<8:0> and the parity XP<1:0> to Excusive-OR to output the resultant parity ZP<1:0>.

A conventional averaging circuit with a parity prediction circuit that includes the parity protected adder 950 and the parity protected shifter 960 is explained next. FIG. 9G illustrates an example of a conventional averaging circuit that includes a parity prediction circuit.

The averaging circuit 970 obtains an average of two 16-bit input data X<15:00> and Y<15:00> by shifting the sum output from the adder 951 to the right by one bit using the 1-bit-right shifter 961.

An Excusive-OR of an output from the summed parity inversion prediction circuit 952, and input parity XP<1:0>, YP<1:0> is calculated. The Excusive-OR of this result and an output from the shifted parity inversion prediction circuit 962 gives the resultant parity ZP<1:0>.

As for the-average, it is sufficient to shift the sum output from the adder, by one bit. On the contrary, for the parity, it is required to execute Excusive-OR of the two input data and the input parity. Therefore, a delay critical path in the averaging circuit 970 includes calculation of the summed parity from input data in adding operation, input of the summed parity to the parity protected shifter, and output of the shifted parity.

SUMMARY OF THE INVENTION

It is an object of the invention to at least solve the problems in the conventional technology.

An averaging apparatus according to an aspect of the present invention includes a carry generating unit that generates a carry using a least significant bit of each of two binary numbers, wherein the two binary numbers include a first binary number and a second binary number; and an adding unit that adds a first shifted binary number, a second shifted binary number, and the carry generated, to thereby output an average of the two binary numbers, wherein the carry generated is added to a least significant bit position, and wherein the first shifted binary number is obtained by right-shifting the first binary number by one bit, and the second shifted binary number is obtained by right-shifting the second binary number by one bit.

An averaging system according to another aspect of the present invention includes an inputting unit that inputs a first binary data and a second binary data, wherein the first binary data includes a plurality of first binary numbers and the second binary data includes a plurality of second binary numbers; a plurality of averaging apparatuses each of which includes a carry generating unit that generates a carry using a least significant bit of one of the first binary number and a least significant bit of one of the second binary number; a right-shifting unit that right-shifts the one of the first binary number by one bit to obtain a first shifted binary number and the one of the second binary number by one bit to obtain a second shifted binary number; and an adding unit that adds the first shifted binary number, the second shifted binary number and the carry generated, to thereby obtain an average of the one of the first binary number and the one of the second binary number, wherein the carry generated is added to a least significant bit position; and an outputting unit that outputs an average data that includes a plurality of the averages obtained.

An averaging method according to still another aspect of the present invention includes generating a carry using a least significant bit of each of two binary numbers, wherein the two binary numbers include a first binary number and a second binary number; and adding a first shifted binary number, a second shifted binary number, and the carry generated, thereby outputting an average of the two binary numbers, wherein the adding includes adding the carry generated to a least significant bit position, and wherein the first shifted binary number is obtained by right-shifting the first binary number by one bit, and the second shifted binary number is obtained by right-shifting the second binary number by one bit.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 illustrates an example of a 4-parallel averaging circuit for calculating an average of the data formatted as illustrated in FIG. 3;

FIG. 5 illustrates a process that uses a conventional adder for calculating the average of the data formatted as illustrated in FIG. 3;

DETAILED DESCRIPTION

Exemplary embodiments of a method and an apparatus for averaging according to the present invention will be explained in detail with reference to the accompanying drawings. A first embodiment is employed to explain an averaging circuit for calculating an average of data without parity, and a second embodiment to explain a parity protected averaging circuit for calculating an average of data with parity.

Figure 1:
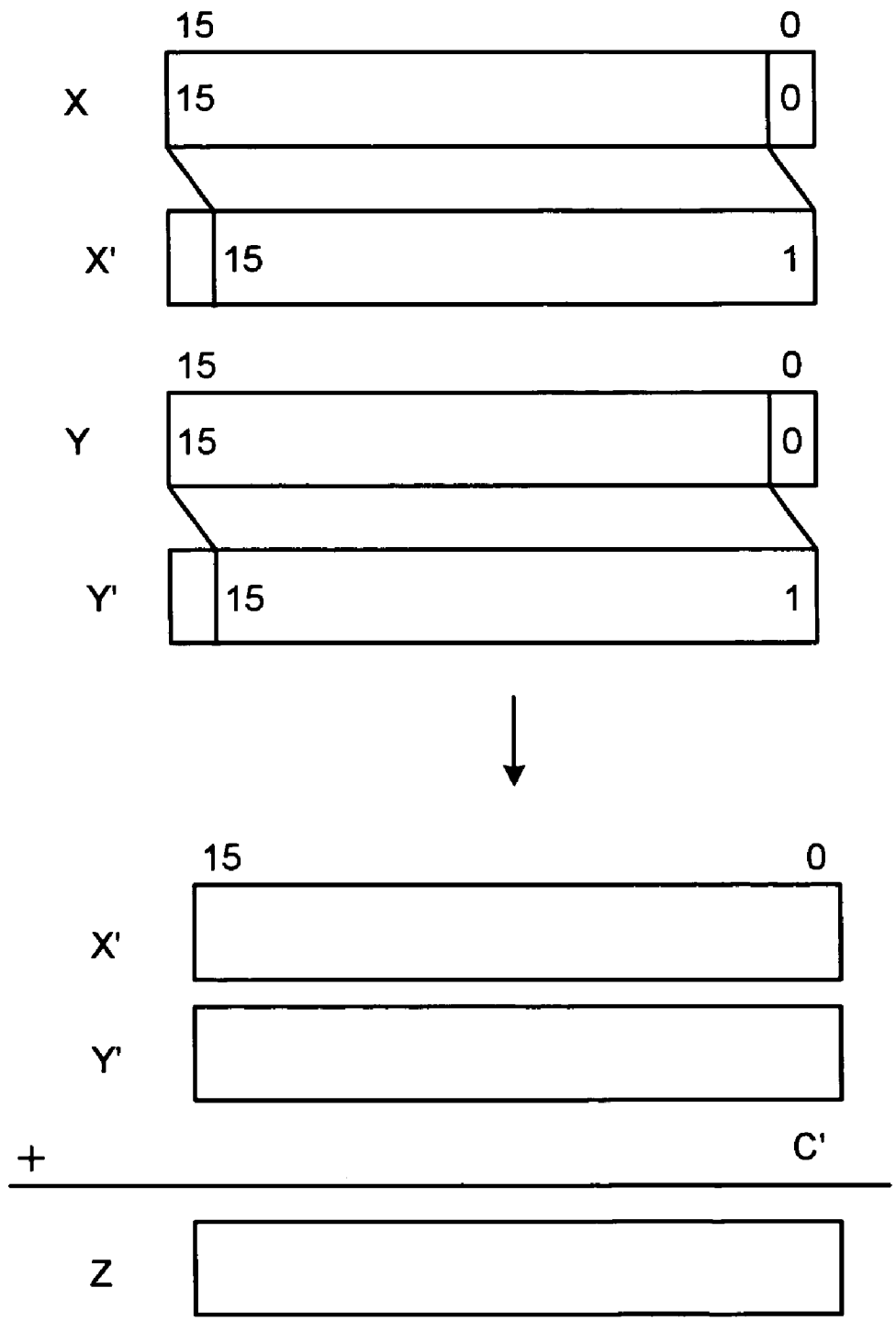
FIG. 1 is an illustration to explain an averaging process according to a first embodiment.

An averaging process according to the first embodiment is explained below with reference to FIG. 1. An average Z<15:00> of two input data X<15:00> and Y<15:00> is calculated as follows.

(1) Divide the two input data X<15:00> and Y<15:00> by 2 to obtain X'<15:00> and Y'<15:00>. It is known that shifting a binary number to the right by one bit divides the binary number by 2. Therefore, X'<15:00> and Y'<15:00> are obtained by a 1-bit right-shift process.

(2) Add X'<15:00> and Y'<15:00> with C' as a carry to the least significant bit to obtain an average Z. The carry C' can be determined from input data X<0>, Y<0> and a type of averaging process. Specifically, if the averaging process is rounding off, then C'=X<0>+Y<0>, where "+" indicates logical sum, and if the averaging process is rounding down, then C'=X<0> & Y<0> where "&" indicates logical product.

In the averaging process according to the first embodiment, an average Z=(X+Y)/2+C of two binary numbers X and Y is derived as Z=(X/2+Y/2)+C'. It is known that shifting a binary number to the right by one bit divides the binary number by 2. Therefore, the input data is shifted to the right by one bit and fed to the adder, and the least significant carry C' is added to obtain an average.

As an example, from the two values used above, that is, X=49834 (decimal)=1100 0010 1010 1010 (binary) and Y=34085 (decimal)=1000 0101 0010 0101 (binary), a rounded-off average of the two numbers, Z=41960 (decimal) =1010 0011 1110 1000 (binary) can be derived according to the procedure described below.

(1) Divide the two numbers by 2 by shifting each number to the right by one bit. Note that "." indicates the position of the decimal point.

X' (decimal)=24917

X' (binary)=0110 0001 0101 0101.0

Y' (decimal)=17042.5

Y' (binary)=0100 0010 1001 0010.1

(2) Add fragments after the decimal point of X' and Y' as they are, and for values before the decimal point, add the rounded-off carry C'="1" to the least significant bit.

Z (decimal)=24917+17042+1=41960

Z (binary)=0110 0001 0101 0101+0100 0010 1001 0010+1=1010 0011 1110 1000

Thus, the averaging process according to the first embodiment includes shifting of two numbers and summing, which is in reverse order compared to the conventional process, in which summing is followed by shifting. This also helps speed up averaging of parity protected data as explained in the second embodiment.

Figure 2:
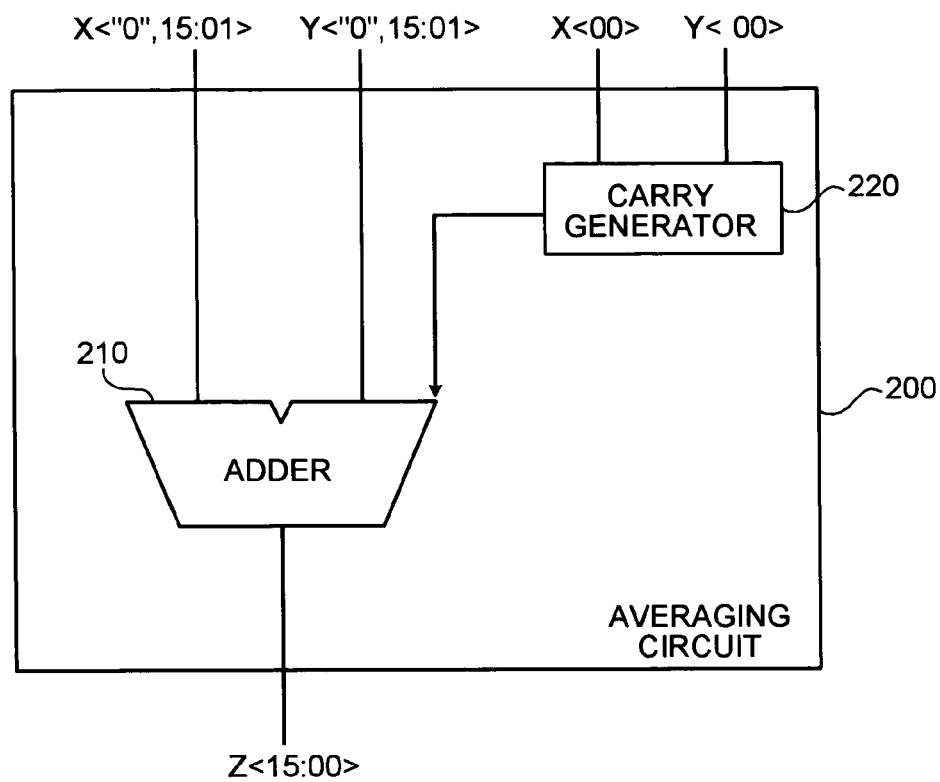
FIG. 2 is a functional block diagram of an averaging circuit.

FIG. 2 is a functional block diagram of the averaging circuit according to the first embodiment. An averaging circuit 200 includes an adder 210 and a carry generator 220.

The adder 210 adds two 16-bit data inputs and a carry input to the least significant bit. For averaging two numbers X<15:00> and Y<15:00>, the adder 210 adds the carry input and the 16-bit data inputs in which "0" is added to the most significant bits of X<15:01 > and Y<15:01>. Therefore, the sum Z<15:00> output from the adder 210 is directly an average of X<15:00> and Y<15:00>.

Using X<00> and Y<00>, the carry generator 220 generates a carry to be added to the least significant bit position in the adder 210. If a rounding off method is used, the carry generator 220 outputs a carry C'=X<00>+Y<00, and if a rounding down method is used, the carry generator 220 outputs a carry C'=X<00> & Y<00>.

As described above, the carry generator 220 generates the carry using the least significant bits X<00> and Y<00> of the input data. In addition, the adder 210 adds the carry generated with right-shifted data X<15:01> and Y<15:01> in which "0" is added to the upper-most bits after right-shifting by one bit. Thus, the averaging circuit 200 calculates the average.

Figure 3:
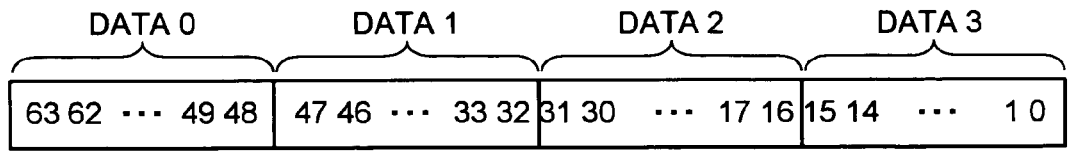
FIG. 3 illustrates an example of a data format that contains plural pieces of data to be averaged.

A case, in which certain length of data includes plural pieces of data to be averaged, is explained next. FIG. 3 illustrates an example of a data format that contains plural pieces of data to be averaged. As illustrated, there are four 8-bit data within 64-bit data.

FIG. 4 illustrates an example of a 4-parallel averaging circuit for calculating an average of the data formatted as illustrated in FIG. 3. A 4-parallel averaging circuit 400 includes four averaging circuits 200 to generate four averages in parallel using two 64-bit data inputs, one of which is illustrated in FIG. 3.

FIG. 5 illustrates a process that uses a conventional adder for calculating the average of the data formatted as illustrated in FIG. 3. If a conventional 64-bit adder is used, 8-byte input data X<63:00> and Y<63:00> to be averaged are shifted to the right by one bit, to obtain X' <63:00>=X<"0",63:49,"0",47:33,"0",31:17,"0",15:01> Y' <63:00>=Y<"0",63:49,"0",47:33,"0",31:17,"0",15:01> having "0" in bit positions <63>, <47>, <31>, <15>. X' and Y' are added with carries C48, C32, C16, C00 to bit positions <48>, <32>, <16>, <00>.

The data in the bit positions <48>, <32>, <16>, <00> in the input data X and Y are employed only for carry generation as described next, and do not impart any effect on an actual sum. In this adding operation, if the average is obtained by rounding off, the carry IN signals C48, C32, C16, C00 added to the bit positions <48>, <32>, <16>, <00> are generated by the formulas C<48>=X<48>+Y<48>, C<32>=X<32>+Y<32>, C<16>=X<16>+Y<16>, C<00>=X<00>+Y<00>, independent of the carry propagation condition from data at the lower position. Whereas, if rounding down method is used, then the formulas C<48>=X<48> & Y<48>, C<32>=X<32> & Y<32>, C<16>=X<16> & Y<16>, C<00>=X<00> & Y<00> are used.

Carry propagation from the bit positions <47>, <31>, <15> to the upper position is inhibited. Thus, only a few other circuits need be combined with the conventional adder to calculate plural averages.

Figure 6:
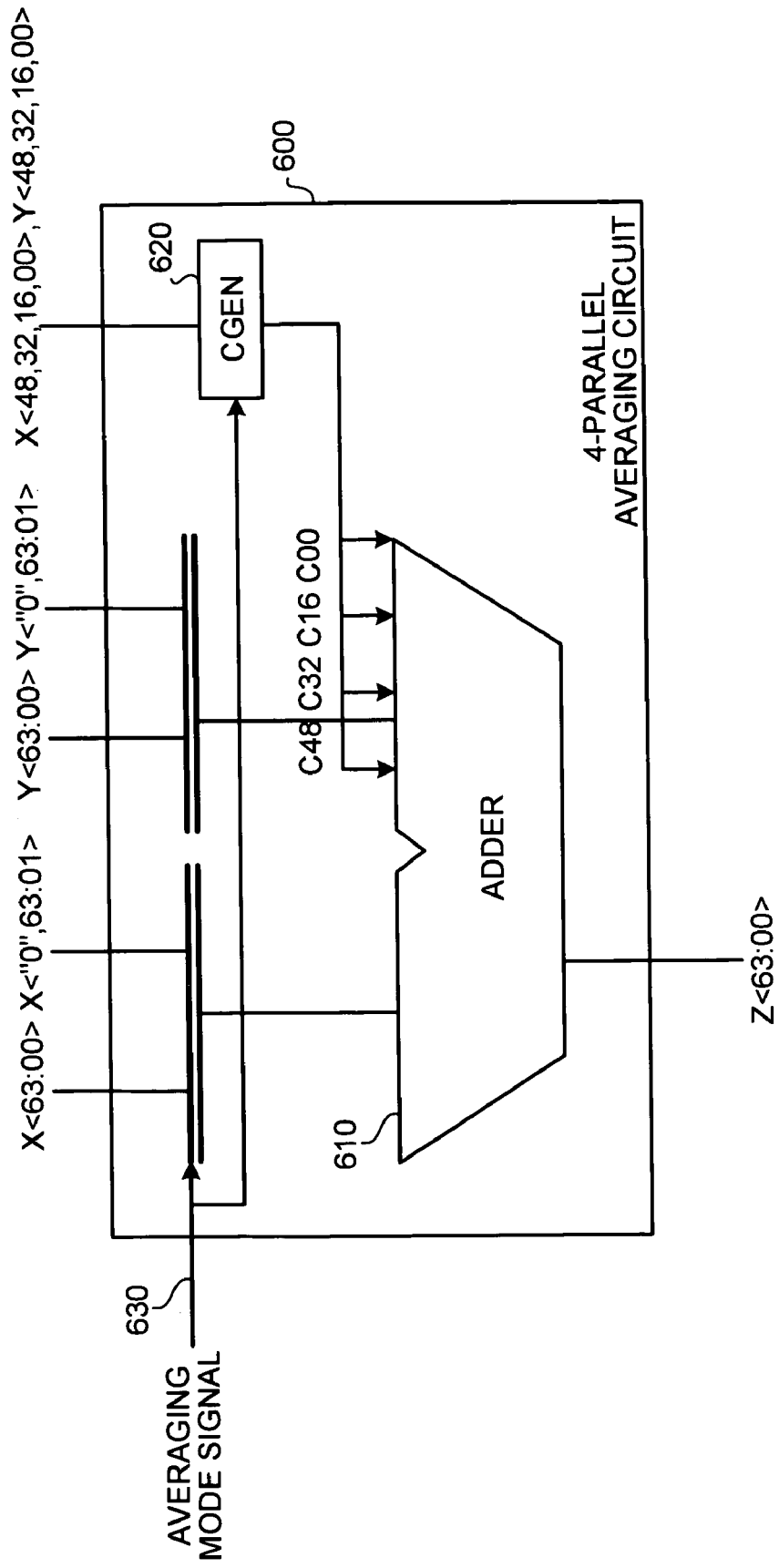
FIG. 6 illustrates an example of a 4-parallel averaging circuit that uses a conventional adder for calculating an average of the data formatted as illustrated in FIG. 3.

FIG. 6 illustrates an example of a 4-parallel averaging circuit that uses a conventional adder for calculating an average of the data formatted as illustrated in FIG. 3. If an averaging mode signal 630 is equal to "0", the two numbers are input into the adder for addition. Whereas, if the averaging mode signal 630 is equal to "1", the two numbers are shifted to the right by one bit and fed into an adder 610, which adds the numbers and the carry generated by a carry generator 620.

Similarly, if the averaging mode signal 630 is equal to "1" and if the rounding off method is used for averaging, the carry signals C48, C32, C16, C00 for the bit positions <48>, <32>, <16>, <00> in adding operation are generated by the carry generator 620 according to the formulas C<48>=X<48>+Y<48>, C<32>=X<32>+Y<32>, C<16>=X<16>+Y<16>, C<00>=X<00>+Y<00>. Whereas, if the rounding down method is used, then the formulas C<48>=X<48> & Y<48>, C<32>=X<32> & Y<32>, C<16>=X<16> & Y<16>, C<00>=X<00> & Y<00> are used.

Carry propagation from the bit positions <47>, <31>, <15> to the upper position is inhibited. Thus, in such circuit configuration, only a few other circuits need be combined with the conventional adder. Consequently, the hardware for averaging reduces.

As described above, in the first embodiment, the carry generator 220 generates the carry using the least significant bits of two input data. In addition, the adder 210 adds the carry generated with right-shifted data obtained by shifting the input data to the right by one bit, and outputs the average.

A parity protected averaging circuit for calculating an average of parity protected data is explained next as a second embodiment. A configuration of the parity protected averaging circuit according to the second embodiment is explained first.

Figure 7:
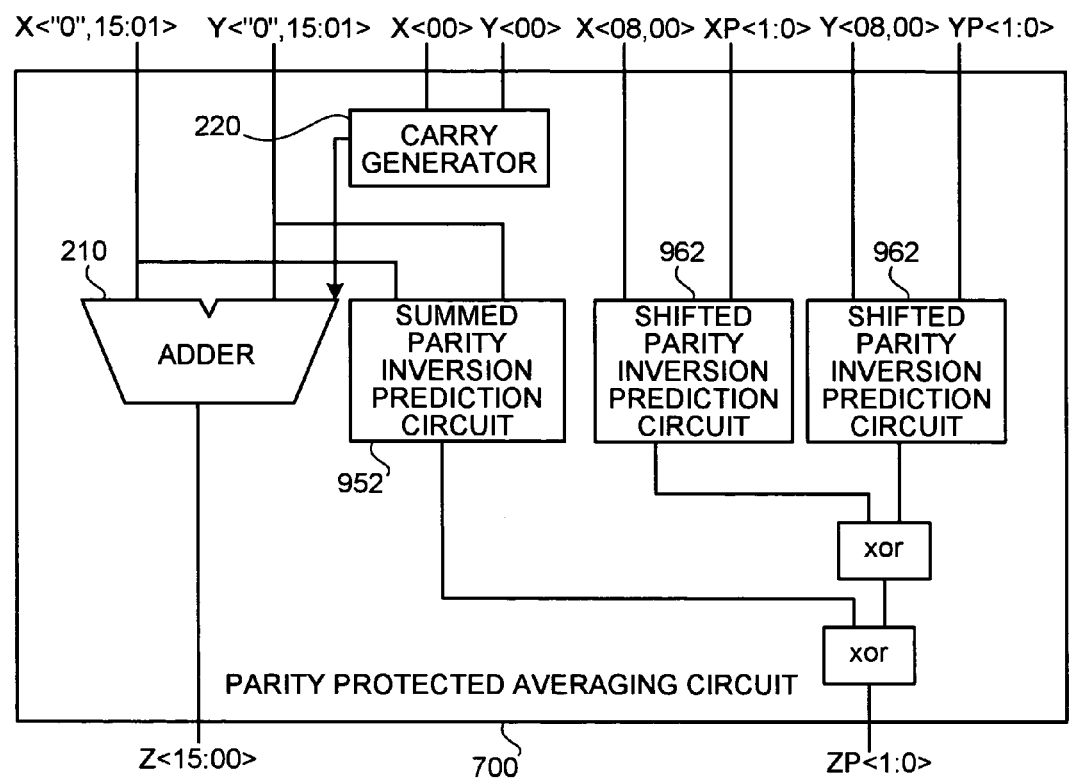
FIG. 7 is a functional block diagram of a parity protected averaging circuit according to a second embodiment.
Figure 9A:
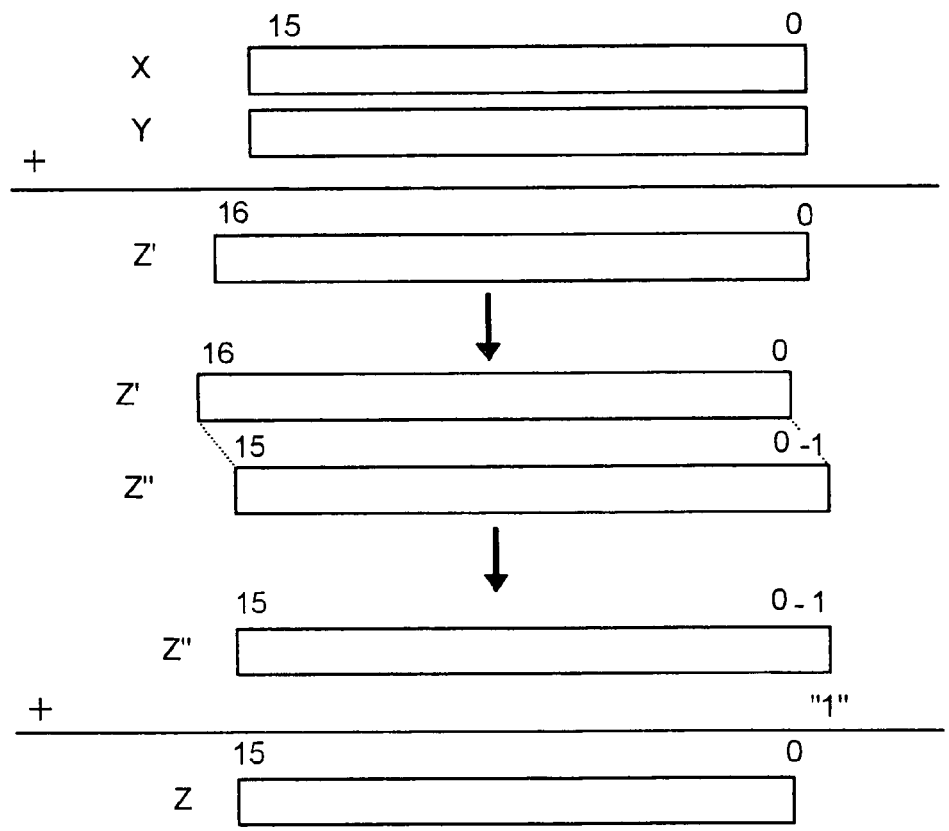
FIG. 9A illustrates a basic averaging process.
Figure 9B:
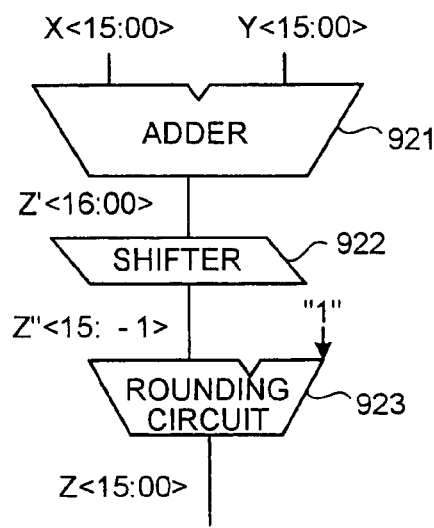
FIG. 9B illustrates an averaging circuit for calculating an average by the basic averaging process.
Figure 9C:
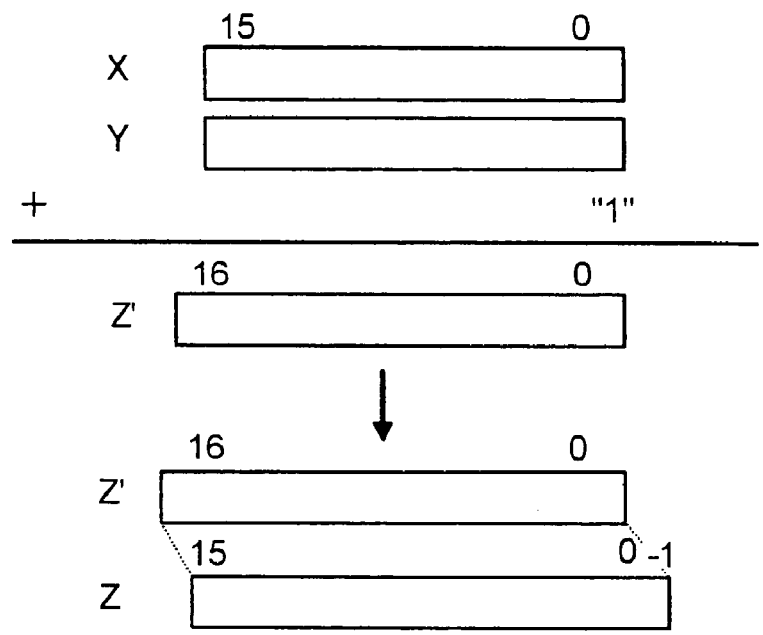
FIG. 9C illustrates an improved averaging process.
Figure 9D:
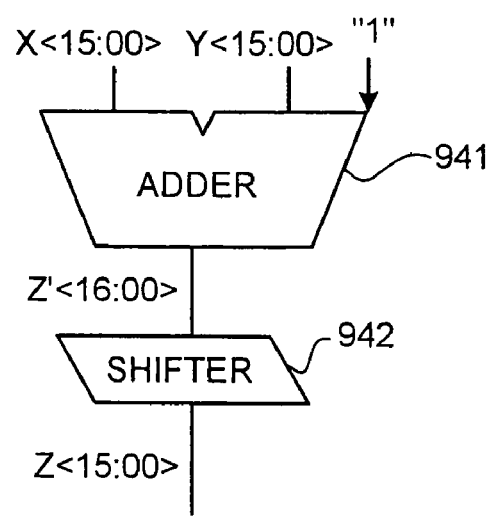
FIG. 9D illustrates an averaging circuit for calculating an average by the improved averaging process.
Figure 9E:
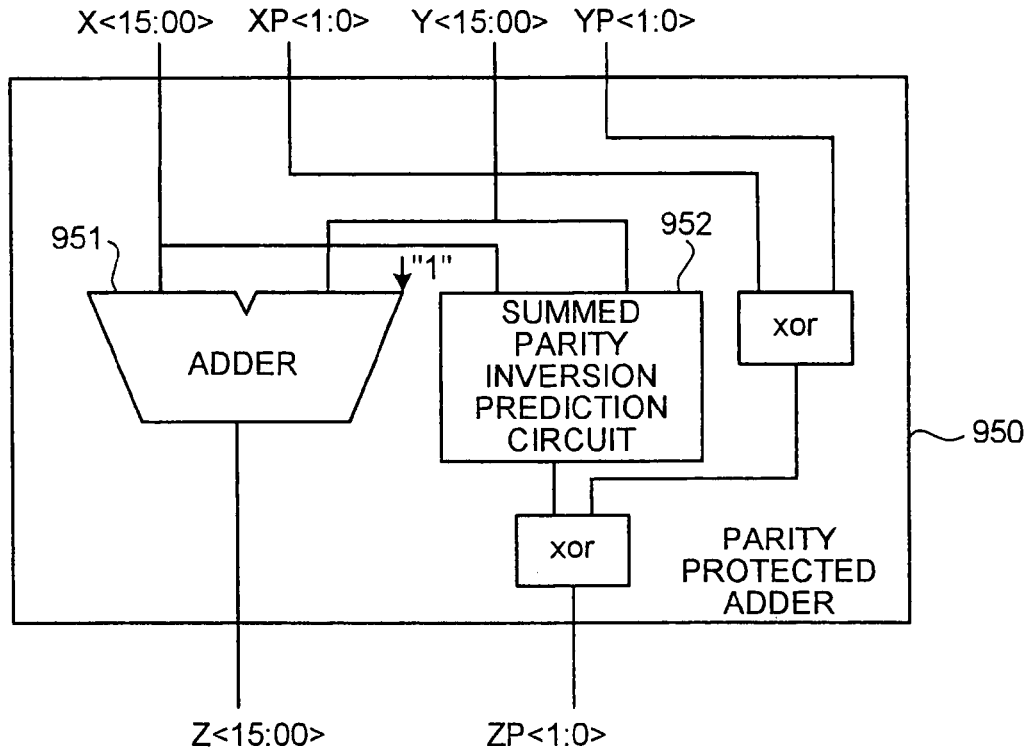
FIG. 9E illustrates an example of a conventional parity protected adder.
Figure 9F:
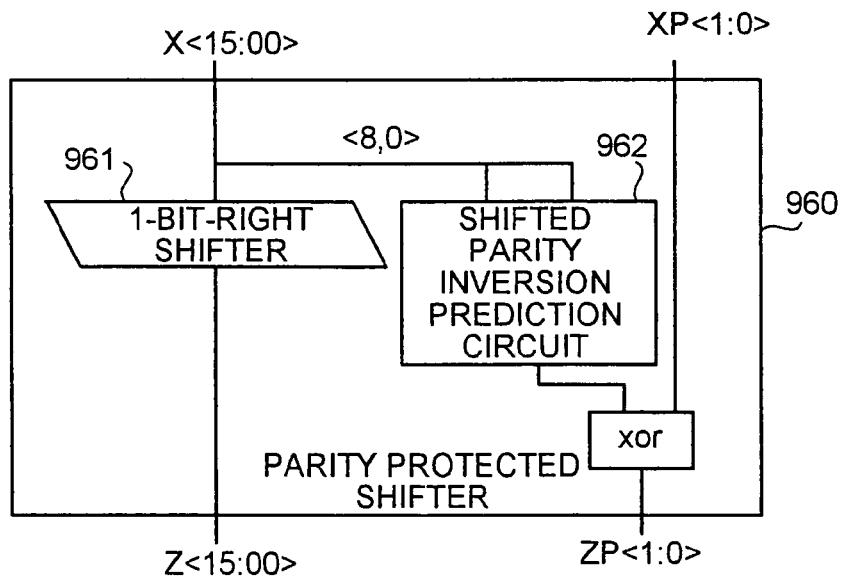
FIG. 9F illustrates an example of a conventional parity protected shifter.
Figure 9G:
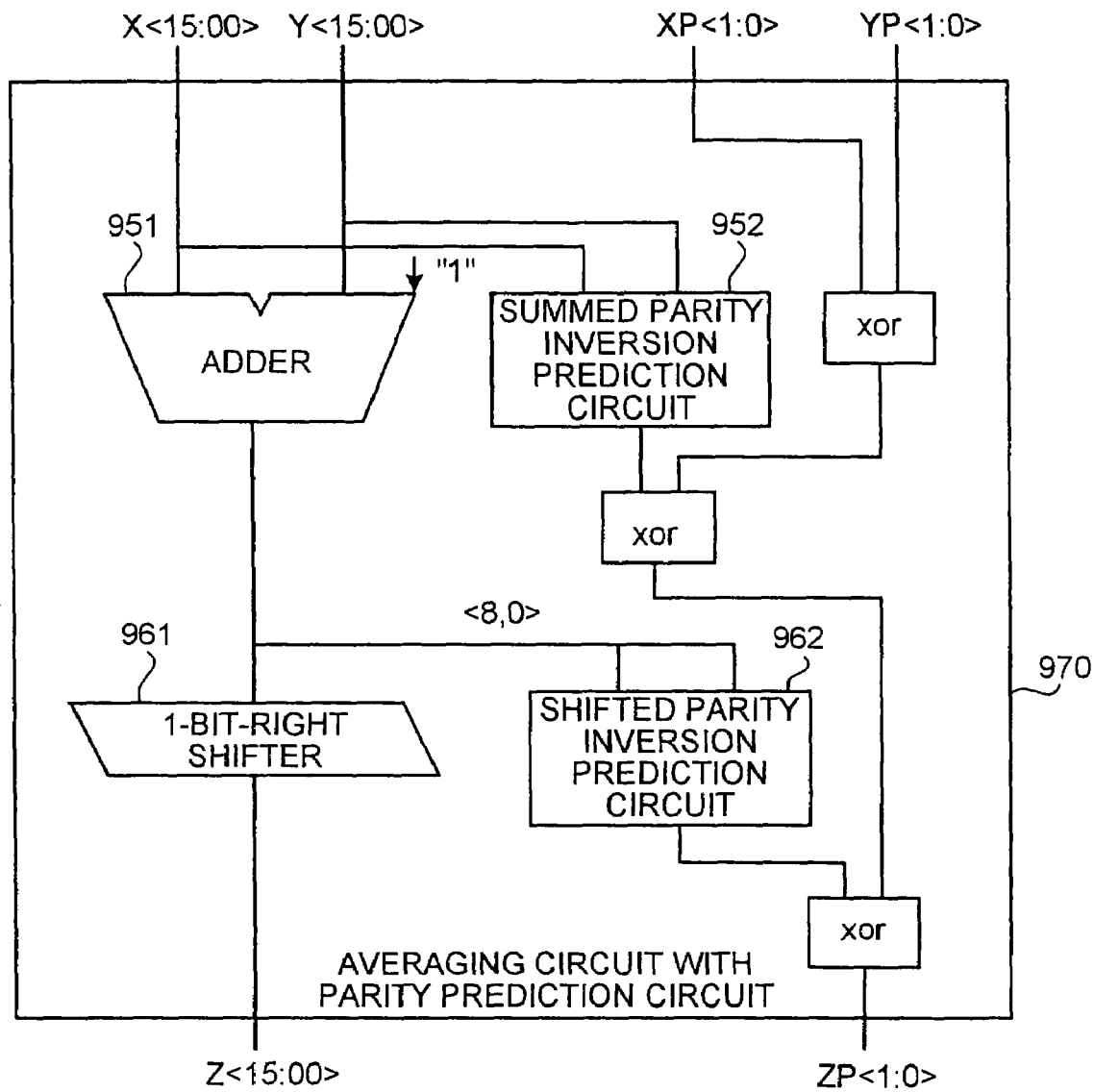
FIG. 9G illustrates an example of a conventional averaging circuit that includes a parity prediction circuit.

FIG. 7 is a functional block diagram of parity protected averaging circuit according to the second embodiment. For convenience of explanation, portions similar in function to those in FIG. 2 and FIG. 9G are designated by identical reference numerals, and detailed explanation thereof is omitted hereinafter.

As illustrated, a parity protected averaging circuit 700 includes the adder 210, the carry generator 220, a summed parity inversion prediction circuit 952, and two shifted parity inversion prediction circuits 962.

The parity protected averaging circuit 700 calculates an average according to the following procedure. Two sets of input data and parity X<15:00> and XP<1:0>, Y<15:00> and YP<1:0> are input. X<15:01> and Y<15:01> of these two input data are made 16-bit by adding "0" to the most significant bit position, and summed in the adder 210 along with carry C added to the least significant bit. The carry generator 220 generates the carry C. The 16-bit sum output from the adder 210 is the desired average Z<15:00>.

Parity ZP<1:0> is calculated according to the following procedure. First, the two shifted parity inversion prediction circuits 962 calculate shifted parities XP'<1:0> and YP'<1:0>, where $$XP'<1> = XP<1> \forall X<8>,$$
$$XP'<0> = XP<0> \forall X<8> \forall X<0>,$$

$$YP'<1> = YP<1> \forall Y<8>,$$
$$YP'<0> = YP<0> \forall Y<8> \forall Y<0>.$$

In parallel with the calculation of the shifted parity, the summed parity inversion prediction circuit 952 generates a summed parity inversion signal, which is subjected to Excusive-OR with the shifted parities XP'<1:0> and YP'<1:0> to yield a summed parity or averaged parity ZP<1:0>.

Thus, the parity protected averaging circuit 700 can calculate the averaged parity ZP<1:0> quickly, because the summed parity inversion prediction circuit 952 and the shifted parity inversion prediction circuits 962 execute in parallel. The execution of the parity protected averaging circuit with respect to processing time is explained with reference to FIG. 8.

Figure 8:
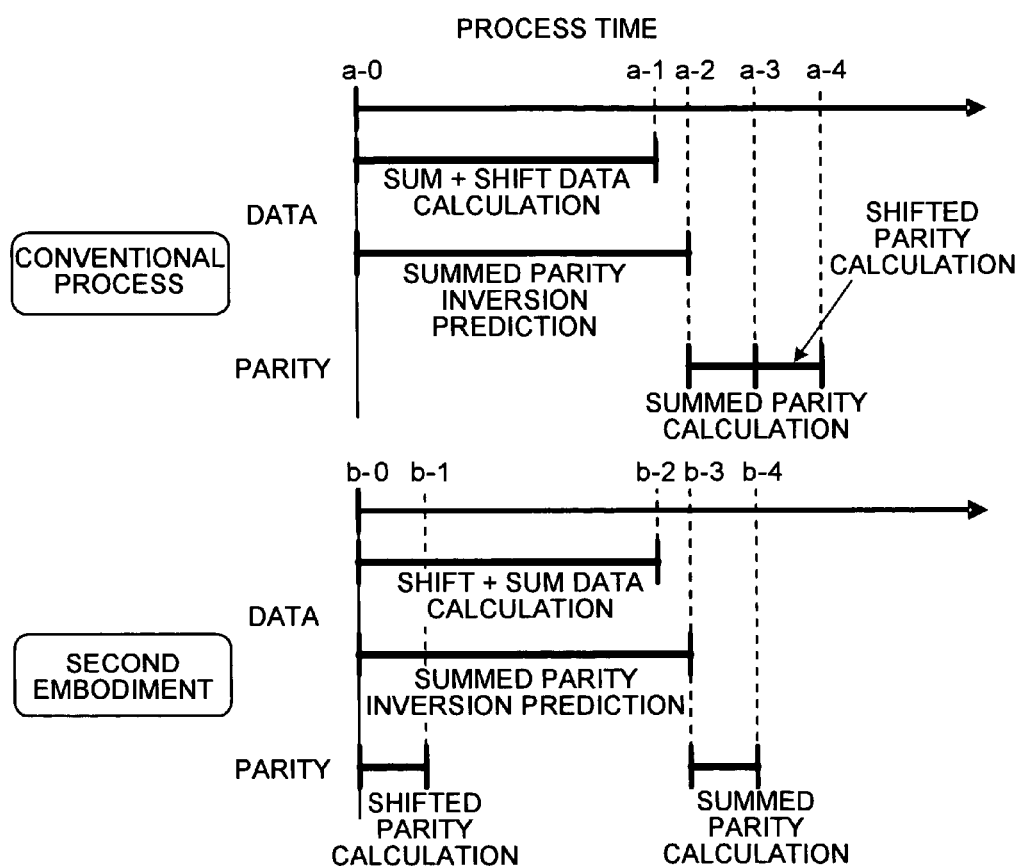
FIG. 8 illustrates a comparison between the conventional process and the second embodiment based on processing time.

FIG. 8 illustrates a comparison between the conventional process and the second embodiment based on processing time. The conventional process includes shifting the summed result by one bit, while the process according to the second embodiment includes shifting each of the two input data by one bit and then summing. In both processes, time required for the shifting of data may be assumed to be substantially same.

As illustrated in FIG. 8, time required for calculating an average is substantially equal to time required for calculating a sum. In the conventional process, first the sum is calculated (timing a-1), and then the shift parity is calculated (timing a-3) based on the summed parity calculated (timing a-2).

On the contrary, in the process according to the second embodiment, the process of calculating the shifted parity and the process of shifting the inputs and adding can be started at the same time (timing b-0). Moreover, the shifted parity that is required for calculating the summed parity, is calculated before the process of the summed parity inversion prediction is complete (timing b-3). Therefore, the process of shifted parity calculation (timing b-1) can entirely overlap the process of addition. Consequently, the overall processing time reduces (timing b-4). Thus, the use of the process according to the second embodiment speeds up the averaging process.

As described above, in the second embodiment, the two shifted parity inversion prediction circuits 962 calculate shifted parities XP'<1:0> and YP'<1:0>. In parallel with the calculation of the shifted parity, the summed parity inversion prediction circuit 952 generates the summed parity inversion signal, which is subjected to Excusive-OR along with the shifted parities XP'<1:0> and YP'<1:0> to yield the averaged parity ZP<1:0>. Therefore, averaging of parity protected data speeds up.

The method and apparatus for averaging according to the present invention includes generating a carry from the least significant bits in two binary numbers, shifting the two binary numbers to the right by one bit, adding the generated carry with the two binary numbers shifted, and predicting the parity of the average of two parity protected binary numbers. Thus, the average of two parity protected binary numbers is calculated quickly.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An averaging apparatus comprising:
   a carry generating unit that inputs a least significant bit of each of two binary numbers and generates a carry, wherein the two binary numbers include a first binary number and a second binary number; and
   an adding unit that inputs a first shifted binary number, a second shifted binary number, and the carry, adds the first shifted binary number, the second shifted binary number and the carry, and outputs an average of the two binary numbers, wherein the carry is added to a least significant bit position, and wherein the first shifted binary number is obtained by right-shifting the first binary number by one bit, and the second shifted binary number is obtained by right-shifting the second binary number by one bit.

2. The averaging circuit according to claim 1, further comprising:
   a parity predicting unit that predicts a parity of the average, wherein the two binary numbers are parity protected binary numbers having a parity bit included therein, and wherein the parity protected binary numbers include a first parity protected binary number and a second parity protected binary number.

3. The averaging apparatus according to claim 2, wherein the parity predicting unit includes:
   a first shift parity predicting unit that predicts a first shift parity of the first shifted binary number, wherein the first shifted binary number is obtained by right-shifting the first parity protected binary number by one bit;
   a second shift parity predicting unit that predicts a second shift parity of the second shifted binary number, wherein the second shifted binary number is obtained by right-shifting the second parity protected binary number by one bit; and
   a summed parity predicting unit that predicts a parity of the average based on the first shift parity and the second shift parity.

4. The averaging apparatus according to claim 1, wherein for averaging by rounding off method, the carry generating unit generates the carry based on a logical sum of the least significant bit of each of the two binary numbers, and for averaging by rounding down method, the carry generating unit generates the carry based on a logical product of the least significant bit of each of the two binary numbers.

5. The averaging apparatus according to claim 1, wherein if an averaging signal is set, the adding unit adds the first shifted binary number, the second shifted binary number, and the carry generated, and if the averaging signal is not set, the adding unit adds the two binary numbers.

6. The averaging apparatus according to claim 1, further comprising:
   a right-shifting unit that right-shifts the first binary number by one bit to obtain the first shifted binary number, and the second binary number by one bit to obtain the second shifted binary number.

7. An averaging system comprising:
   an inputting unit that inputs a first binary data and a second binary data, wherein the first binary data includes a plurality of first binary numbers and the second binary data includes a plurality of second binary numbers;
   a plurality of averaging apparatuses each of which includes
      a carry generating unit that inputs a least significant bit of one of the first binary numbers and a least significant bit of one of the second binary numbers and generates a carry;
      a right-shifting unit that right-shifts the one of the first binary numbers by one bit to obtain a first shifted binary number and the one of the second binary numbers by one bit to obtain a second shifted binary number; and
      an adding unit that inputs the first shifted binary number, the second shifted binary number and the carry, adds the first shifted binary number, the second shifted binary number and the carry, and outputs an average of the one of the first binary numbers and the one of the second binary numbers, wherein the carry generated is added to a least significant bit position; and
   an outputting unit that outputs an average data that includes a plurality of averages from the plurality of averaging apparatuses.

8. An averaging method of an image processing averaging circuit, comprising:
   generating a carry using a least significant bit of each of two binary numbers, wherein the two binary numbers include a first binary number and a second binary number;
   right-shifting the first binary number by one bit to obtain a first shifted binary number, and the second binary number by one bit to obtain a second shifted binary number;
   adding the first shifted binary number, the second shifted binary number, and the carry; and
   outputting an average of the two binary numbers, wherein the adding includes adding the carry to a least significant bit position.

9. The method according to claim 8, further comprising:
   predicting a parity of the average, wherein the two binary numbers are parity protected binary numbers having a parity bit included therein, and wherein the parity protected binary numbers include a first parity protected binary number and a second parity protected binary number.

10. The method according to claim 9, wherein the predicting includes:
    a first shift parity predicting including predicting a first shift parity of the first shifted binary number, wherein the first shifted binary number is obtained by right-shifting the first parity protected binary number by one bit;
    a second shift parity predicting including predicting a second shift parity of the second shifted binary number, wherein the second shifted binary number is obtained by right-shifting the second parity protected binary number by one bit; and
    a summed parity predicting that includes predicting a parity of the average based on the first shift parity and the second shift parity.

11. The method according to claim 8, wherein for averaging by rounding off method, the generating includes generating the carry based on a logical sum of the least significant bit of each of the two binary numbers, and for averaging by rounding down method, the generating includes generating the carry based on a logical product of the least significant bit of each of the two binary numbers.

12. The method according to claim 8, wherein if an averaging signal is set, the adding includes adding the first shifted binary number, the second shifted binary number, and the carry generated, and if the averaging signal is not set, the adding includes adding the two binary numbers.

13. An averaging circuit for image data, comprising:
    a carry generating circuit that generates a carry using a least significant bit of each of two binary numbers of the image data, wherein the two binary numbers include a first binary number and a second binary number; and
    an adding circuit that adds a first shifted binary number, a second shifted binary number, and the carry, to thereby output an average of the two binary numbers of the image data, wherein the carry is added to a least significant bit position, and wherein the first shifted binary number is obtained by right-shifting the first binary number by one bit, and the second shifted binary number is obtained by right-shifting the second binary number by one bit.

* * * * *